United States Patent [19]

Russell

[11] 4,331,311
[45] May 25, 1982

[54] COMPOUND BOW HOLDER

[76] Inventor: Claude J. Russell, 409 Fayette St., Jonesville, Mich. 49250

[21] Appl. No.: 271,534

[22] Filed: Jun. 8, 1981

[51] Int. Cl.³ ............................................. F16M 11/00
[52] U.S. Cl. .................................. 248/176; 124/23 R
[58] Field of Search ...................... 124/24 R, 23 R, 86, 124/1; 248/127, 156, 346, 174, 122, 176, 178

[56] References Cited

U.S. PATENT DOCUMENTS

| | | | |
|---|---|---|---|
| 1,932,951 | 10/1933 | Barieau | 248/127 |
| 2,899,155 | 8/1959 | Rogers | 248/156 X |
| 3,286,961 | 11/1966 | Mandolare | 248/122 X |
| 3,584,820 | 6/1971 | Butcher | 248/156 X |
| 3,991,780 | 11/1976 | Maroski | 248/122 X |

Primary Examiner—Richard C. Pinkham
Assistant Examiner—William R. Browne
Attorney, Agent, or Firm—Beaman & Beaman

[57] ABSTRACT

The device pertains to archery equipment, and in particular is directed to a holder for supporting a compound bow in a substantially upright position when not in use. The compound bow holder has a base having a rear region upon which a pair of upstanding brackets are defined which are in spaced relationship forming a notch therebetween and a pedestal mounted upon the base front region supports a bow limb engaging cradle. The underside of the end of the bow limb extends below the brackets whereby the bow lower eccentric cam is located within the notch, and the cradle supports the bow limb at a location spaced from the bow end. The brackets are adjustably mounted upon the base for selective longitudinal and transverse placement, and the cradle is pivotally mounted upon its pedestal for adjustment to the particular bow configuration being supported.

9 Claims, 4 Drawing Figures

COMPOUND BOW HOLDER

BACKGROUND OF THE INVENTION

Compound archery bows utilize pulleys, eccentric cams and complex string arrangements to provide the desired operating characteristics. For instance, compound bows do not require the force to extend the bow to its full capacity, and maintain the pull force, as is required with a conventional archery bow. Compound bows are complex in construction, and expensive to manufacture, and are often relatively heavy as to be burdensome to handle and support intermediate shooting use. Because of the complexity and expense of the bow it is not desirable to lay the bow on the ground or floor, and yet, an inexpensive, simple and effective holder for compound bows has not heretofore been available.

Stands or supports for archery bows are known, such as shown in U.S. Pat. No. 3,256,872, and devices are utilized with bows to aid in the stringing wherein the bow is supported upon a stand, such as shown in U.S. Pat. No. 3,209,442. However, devices of the aforementioned and known type are not readily usable with compound bows, and the presence of pulleys and eccentric cams does not permit known bow holder stands to be utilized with compound bows.

It is an object of the invention to provide a holder for a compound bow wherein the holder is of a relatively simple construction, yet is capable of accommodating a wide variety of compound bow sizes and configurations and the bow is held in a substantially upright position.

Another object of the invention is to provide a holder for a compound archery bow wherein the holder supports the bow components in such a manner as to be free of damage or misadjustment, yet the bow may be readily removed from the holder, the weight of the bow maintaining the bow within the holder and no latches or movable mechanism are required to support the bow.

Yet another object of the invention is to provide a holder for compound archery bows wherein the holder may be economically produced, includes bow supporting brackets and a cradle which are readily adjustable to accommodate a wide variety of bow sizes and configurations, and wherein the holder may be firmly anchored to a supporting surface.

In the practice of the invention the compound bow holder includes an elongated flat base adapted to rest upon the ground or other supporting surface. At least one opening is defined in the base whereby the base may be attached to a supporting surface by a fastener, stake, or similar element.

The rear region of the base supports a pair of brackets spaced upon the base in side by side relationship defining a notch or clearance therebetween. The brackets include a foot, a column, and an offset portion obiliquely disposed to the horizontal having an underside adapted to be engaged by the rear face of the compound bow limb at its end. The spacing between the offset portions is sufficient to receive the lower bow eccentric cam.

The brackets are mounted upon the base by slots formed in both the base and the bracket feet, and bolts passing through the bracket feet permit adjustment of the brackets in both lateral and transverse directions relative to the base in order to accommodate a wide variety of bow sizes and configurations.

At the front region of the base a pedestal is defined having a cradle pivotally supported thereon. The cradle includes a flat surface adapted to engage the bow limb front face, and the cradle lies directly in alignment with the undersurfaces of the brackets, and will normally be angularly adjusted to be substantially parallel to the bracket undersurfaces.

To mount a compound bow in the aforedescribed holder, the user inserts the bow lower end intermediate the cradle and the bracket offset portions, and by permitting the bow to tilt forwardly, the lower bow limb front face will engage the cradle while the lower eccentric cam will be received between the brackets and the bow end inner face will engage the offset undersurfaces. Accordingly, the lower bow limb will be supported from above at the bow end, and supported from below upon the cradle at a position spaced from the bow end. This support holds the compound bow in a substantially vertical position rendering the bow readily accessible for removal from the holder, and permitting the bow to be quickly and quietly removed from the holder with little movement, as is critical when hunting.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
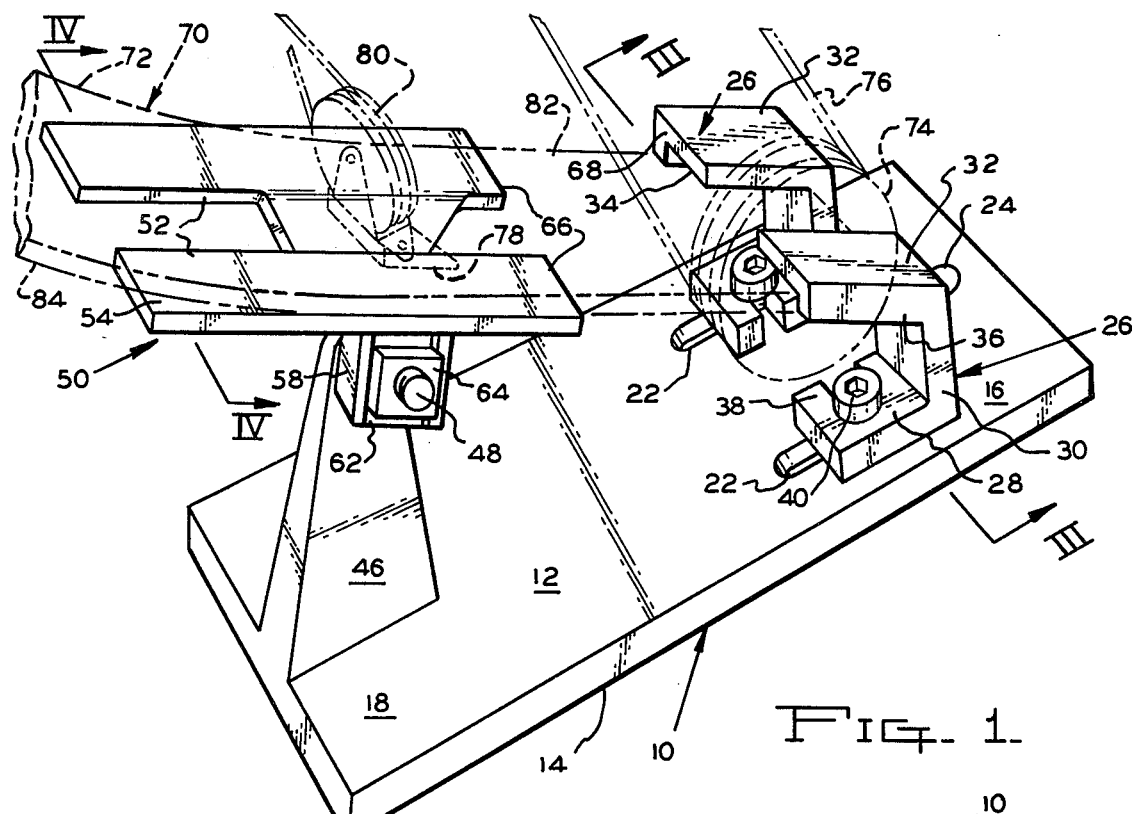
FIG. 1 is a perspective view of a compound bow holder in accord with the invention, the bow structure being shown in phantom lines.

The compound bow holder of the invention includes an elongated flat base 10 of a generally rectangular configuration having an upper surface 12 and a lower surface 14. The base also includes a rear region generally indicated at 16, and a front region at 18. The base 10, and the components of the holder, may be formed of metal or synthetic plastic, and the base lower surface 14 is preferably formed with ribs and recesses, FIG. 3, to reduce the amount of material within the base, and the elongated recesses 20 are in alignment with and are intersected by elongated slots 22 defined in the base upper surface 12 at the rear region 16.

Figure 2:
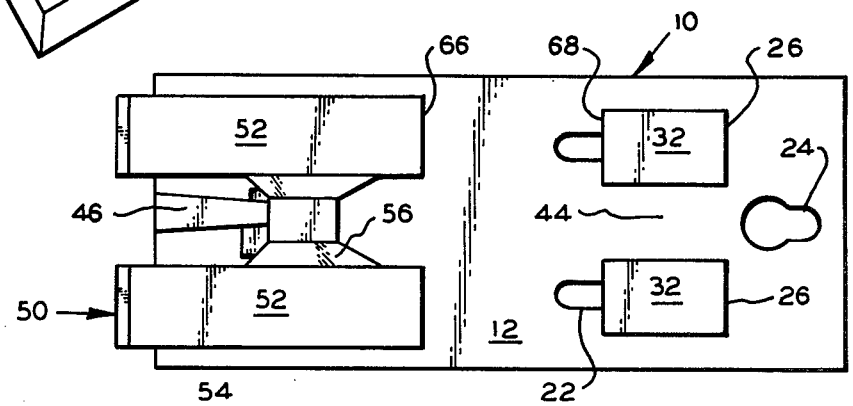
FIG. 2 is a top plan view of the bow holder.

The rear region of the base is provided with an anchor receiving opening 24, FIG. 2, which in the illustrated form is of a keyhole configuration, and is of sufficient diameter to receive a small tent stake, or the head of a large screw, whereby the base may be anchored to a supporting surface, such as the floor of a tree stand, or staked to the ground.

At its rear region, the base supports a pair of projections or brackets 26 mounted upon the upper surface 12. The brackets 26 are mirror images of each other, and each includes a foot 28 transversely disposed to a column 30, and the upper portion of the column includes an offset portion 32 obliquely disposed to the base, and the offset portion includes an undersurface 34 and an outer downwardly extending flange 36 intersecting the undersurface.

The foot 28 is provided with a slot 38 which intersects the inner edge of the associated foot, and the length of the slot is transverse with respect to the direction of extension of the associated offset portion 32. Bolts 40 extending through the foot slot 38 and the base slot 22 are provided with nuts 42 at their lower end, FIG. 3, and in this manner the brackets 26 may be selectively positioned upon the base upper surface 12 both in the direction of the length of the base, and transversely thereto in view of the slots 38.

The brackets 26 are adjusted in accord with the size and configuration of the compound bow to be held, and the brackets will be in spaced relationship to each other defining a notch or clearance 44 therebetween through which the bow lower eccentric cam may extend, as later described.

A pedestal 46 extends perpendicularly from the front region upper surface 12 and includes an upper region in which a bolt 48 is mounted which functions as a pivot pin for supporting the bow leaf engaging cradle thereon. The cradle 50 is of a configuration which will be appreciated from the drawings, including a pair of lateral elongated portions 52, each having a flat upper side 54 defined thereon, and the lateral portions 52 are interconnected by a recessed central interconnecting portion 56 having an underside from which boss 58 depends having a pivot hole 60 defined therein for receiving the bolt 48, and a recess 62 is formed for receiving the nut 64 threaded on bolt 48.

Loosening of the nut 64 permits the cradle 50 to be angularly adjusted with respect to the pedestal 46 about the axis of the bolt 48, and once the desired angular orientation of the cradle is achieved tightening of the nut will maintain the desired cradle position.

To protect the compound bow, the offset portions 32, including undersurfaces 34, and the surfaces 54 of the cradle portions 52, may be provided with a soft or cushioned covering, for instance, these surfaces may be dipped and coated with a plastisol.

In use, the cradle 50 is angularly positioned on the pedestal 46 such that the cradle surfaces 54 are substantially parallel to the bracket undersurfaces 34. As will be appreciated from FIGS. 1 and 2, significant spacing exists between the cradle edges 66, and the bracket offset edges 68, and the lower end of a compund bow limb may be inserted through this spacing for cooperation with the bow holder components.

As the weight of a compound bow is greater than that of the holder, and as the bow will tend to tip the base forwardly when placed within the holder, anchor means are inserted through the base opening 24 to anchor the base when being used. When the base 10 is resting upon the ground a tent stake or pin is inserted through opening 24, and if the base is supported upon a platform or tree stand a screw or bolt may be used, and the keyhole opening configuration permits this type of anchor to be quickly associated with the base.

In FIG. 1 a conventional compound bow 70 is illustrated in phantom lines and includes a lower limb 72, and a lower eccentric cam 74 mounted upon the lowermost portion of the limb end upon which the bow string 76 is mounted. Additionally, a bracket 78 for an idler pully 80 is mounted upon the limb 72 spaced from the cam 74, and the idler pulley bracket will be disposed above the cradle 60 when the bow is placed in the holder.

To place the compound bow 70 within the holder the user inserts the limb lower end between the brackets 26 and cradle 50, and permits the bow to pivot forwardly so that the bow limb rear face 82 engages the undersurfaces 34 of brackets 26, and the bow limb front face 84 will engage the cradle surfaces 54, as shown in FIG. 1. The notch 44 defined between the brackets permits the eccentric cam 74 to extend above and below the offset portions 32, and as the width of the bow limb is less than the spacing between the bracket flanges 36 the flanges will aid in aligning and maintaining the limb lower end against the undersurfaces 34. The cradle recessed portion 56 provides clearance for the bolt, not shown, which extends through the limb 72 for attaching the idler bracket 78 thereto.

The curvature of the bow limb 72, the oblique orientation of the cradle surfaces 54, and the fact that the cradle is at a higher elevation than the undersurfaces 34, will cause the compound bow to be supported within the holder in a substantially upright position rendering the bow readily accessible to the user. When it is desired to remove the compound bow from the holder the bow could be moved substantially parallel to the cradle surfaces 54 until the bow limb clears the bracket undersurfaces 34, but usually the bow will be pivoted rearwardly to disengage the bow limb from the bracket undersurfaces and lift the limb from the cradle. The bow is then lifted from the holder, and cleared therefrom.

Figure 3:
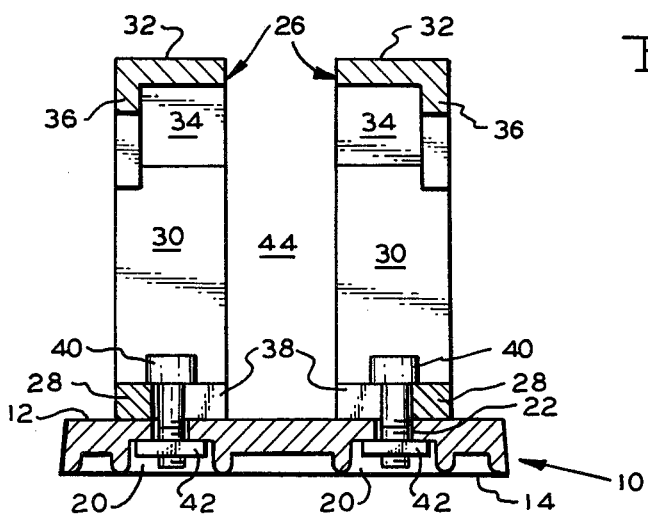
FIG. 3 is an elevational, sectional view taken through the bracket feet along Section III—III of FIG. 1.
Figure 4:
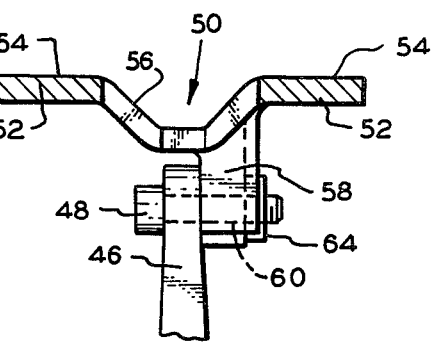
FIG. 4 is an elevational, detail, sectional view as taken along Section IV—IV of FIG. 1.

As the vertical dimension of the base recesses 20 is greater than the vertical dimension of the nuts 42, FIG. 3, the nuts will be recessed to such an extent as to not interfere with the support of the base upon its supporting surface. Further, the "two-way" adjustment of the brackets 26 permit a wide variety of bow sizes and configurations to be accommodated by the holder, and the angular adjustment of the cradle 50 likewise permits ready accommodation to various bows. The recessing of the cradle central region permits the bow limb to be firmly supported upon the cradle in that bolt heads, or other components, mounted upon the central region of the limb will be located between the cradle surfaces 54.

It is appreciated that various modifications to the inventive concepts may be apparent to those skilled in the art without departing from the spirit and scope of the invention.

I claim:

1. A holder for a compound bow comprising, in combination, a base having an upper surface, a lower surface, a rear region and a front region, said base adapted to be supported upon its lower surface in a substantially horizontal orientation, a bifurcated bow end receiving support defined upon said base rear region vertically extending above said upper surface, said support including a pair of spaced projections each having an undersurface disposed toward said base upper surface and separated by a bow eccentric cam receiving notch, a bow limb rest defined upon said base front region vertically extending above said base upper surface obliquely disposed to said base upper surface and spaced from and at a vertical orientation higher than that of said projections undersurfaces, and base mounting means defined upon said base for receiving a surface engaging device.

2. In a holder for a compound bow as in claim 1, adjustable means supporting said limb rest upon said base whereby the oblique angle of said limb rest surface may be selectively adjusted.

3. In a holder for a compound bow as in claim 2, said limb rest including a bow limb cradle having a central region and lateral regions, said lateral regions defining a limb rest surface and said central region being recessed with respect to said lateral regions.

4. In a holder for a compound bow as in claim 3, said limb rest including a pedestal extending from said base front region upper surface having an upper end, said adjustable means supporting said limb rest comprising a pivot mounted in said pedestal upper end, said pivot mounting said bow limb cradle upon said pedestal, and means at said pivot selectively locking said cradle with respect to said pedestal.

5. In a holder for a compound bow as in claim 1, said undersurfaces of said spaced projections being obliquely disposed to said base upper surface, and substantially parallel to said limb rest.

6. In a holder for a compound bow as in claim 1 wherein said bow end receiving support projections each comprises a bracket having a vertically extending column having upper and lower regions and having a foot at said lower region engaging said base upper surface and an offset at said upper region extending toward said limb rest, said projections undersurface being defined upon said offsets, and fastening means attaching each column foot to said base upper surface.

7. In a holder for a compound bow as in claim 6, a pair of slots defined in said base rear region extending in the direction of said base front and rear regions, a column foot being disposed over each slot, and a bolt extending through each slot and the foot superimposed thereover adjustably mounting each bracket upon said base for adjustment in the direction of said slots.

8. In a holder for a compound bow as in claim 7, an elongated opening defined in each column foot having a length transversely disposed to the length of said slots, said bolts extending through said openings and said slots to permit adjustment of said brackets upon said base in transverse directions.

9. In a holder for a compound bow as in claim 1 wherein said bow end receiving support projections each comprise a bracket, means mounting each bracket upon said base upper surface for adjustment thereon, each bracket including an offset extending toward said limb rest defining said undersurface, said limb rest comprising a pedestal extending from said base upper surface front region having an upper end and a bow limb cradle pivotally mounted upon said pedestal upper end for selective pivotal adjustment thereto.

* * * * *